United States Patent
Kato

(10) Patent No.: US 9,852,680 B2
(45) Date of Patent: Dec. 26, 2017

(54) PROJECTION TYPE DISPLAY DEVICE AND METHOD FOR CONTROLLING OPERATION OF PROJECTION TYPE DISPLAY DEVICE

(75) Inventor: Hiroshi Kato, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 33 days.

(21) Appl. No.: 14/357,194

(22) PCT Filed: Jan. 13, 2012

(86) PCT No.: PCT/JP2012/050604
§ 371 (c)(1),
(2), (4) Date: May 8, 2014

(87) PCT Pub. No.: WO2013/105267
PCT Pub. Date: Jul. 18, 2013

(65) Prior Publication Data
US 2014/0300655 A1 Oct. 9, 2014

(51) Int. Cl.
G09G 3/32 (2016.01)
G03B 21/16 (2006.01)
G03B 21/20 (2006.01)

(52) U.S. Cl.
CPC ............. *G09G 3/32* (2013.01); *G03B 21/16* (2013.01); *G03B 21/2053* (2013.01)

(58) Field of Classification Search
CPC ....... G09G 3/32; G03B 21/16; G03B 21/2053
See application file for complete search history.

(56) References Cited

U.S. PATENT DOCUMENTS 6,886,942 B2 * 5/2005 Okada .................... G03B 21/16
348/E9.027
7,131,731 B2 * 11/2006 Oketani ............. G05D 23/1906
348/E5.141

(Continued)

FOREIGN PATENT DOCUMENTS

CN 1573517 A 2/2005
JP H 11-288790 A 10/1999

(Continued)

OTHER PUBLICATIONS

Chinese Office Action dated Jul. 29, 2015 with an English translation thereof.

(Continued)

*Primary Examiner* — Amare Mengistu
*Assistant Examiner* — Sarvesh J Nadkarni
(74) *Attorney, Agent, or Firm* — McGinn IP Law Group, PLLC.

(57) ABSTRACT

A projection-type display which projects and displays images in accordance with an image signal includes a light source for projecting the images, output means that is equipped with a coil and switch, that uses electromagnetic induction of the coil to supply a current, and that changes the magnitude of the current by means of the switch, a cooling fan that cools the projection-type display device and for which the rotational speed is variable; and control means that, upon receiving an instruction to set a first mode in which a first current is intermittently supplied to the light source.

11 Claims, 5 Drawing Sheets

(56) References Cited

U.S. PATENT DOCUMENTS

| | | | |
|---|---|---|---|
| 7,438,420 B2* | 10/2008 | Harada | H04N 9/3114 |
| | | | 315/117 |
| 9,104,059 B2* | 8/2015 | Shioya | G03B 21/16 |
| 2003/0218602 A1* | 11/2003 | Naito | H04N 5/74 |
| | | | 345/204 |
| 2004/0239887 A1* | 12/2004 | Yasuda | G03B 21/16 |
| | | | 353/57 |
| 2005/0007306 A1 | 1/2005 | Ilsaka et al. | |
| 2005/0067979 A1* | 3/2005 | Haruna et al. | 315/291 |
| 2008/0165482 A1* | 7/2008 | Kim | 361/681 |
| 2010/0128232 A1* | 5/2010 | Kagata | H05B 41/2885 |
| | | | 353/85 |
| 2013/0128458 A1* | 5/2013 | Shioya | G02F 1/133385 |
| | | | 361/695 |

FOREIGN PATENT DOCUMENTS

| | | | |
|---|---|---|---|
| JP | 2003-295320 A | 10/2003 |
| JP | 2004-354717 A | 12/2004 |
| JP | 2005-181528 A | 7/2005 |
| JP | 2006-330743 A | 12/2006 |
| JP | 2007-334092 A | 12/2007 |
| JP | 2008-234842 A | 10/2008 |
| JP | 2009-300479 A | 12/2009 |

OTHER PUBLICATIONS

International Search Report (ISR) (PCT Form PCT/ISA/210), in PCT/JP2012/050604, dated Feb. 28, 2012.

* cited by examiner

Fig.5

| ECO-mode | ON | OFF | OFF |
|---|---|---|---|
| Dynamic dimming mode | OFF | ON | OFF |
| LED dimming method | A | B | B |
| Set value of LED current | 10A | 20A | 20A |
| LED lighting duty cycle | 100% | Changes according to image signal level | Changes such that white balance is maintained |
| Set value of rotational speed of cooling fan | 1,000rpm | 2,000rpm | 2,000rpm |
| Set value of gradations of spatial light modulation device | Changes according to the image signal level | 256 | Changes according to the image signal level |

PROJECTION TYPE DISPLAY DEVICE AND METHOD FOR CONTROLLING OPERATION OF PROJECTION TYPE DISPLAY DEVICE

TECHNICAL FIELD

The present invention relates to a projection-type display device that uses semiconductor light-emitting elements such as light-emitting diodes (hereinbelow referred to as "LEDs") as a light source and to a method for controlling the operation of the projection-type display device.

BACKGROUND ART

Among projection-type display devices (such as projectors) that project images onto a screen, projection-type display devices are known that use, as the light source, LEDs in place of high-pressure mercury lamps.

FIGS. 1A and 1B show examples of light source drive unit 200 that lights an LED. Light source drive units 200 shown in FIGS. 1A and 1B are known as constant-current step-down DC-DC converters.

In FIGS. 1A and 1B, voltage controller 104 controls the ON/OFF timing of switching elements 105 and 106 such that the voltage between the terminals of voltage-detecting resistor 102 that is connected in a series with LED 101 is equal to the reference voltage that is generated in reference voltage generation unit 103.

More specifically, in voltage controller 104, error amplifier 104a detects the difference between the reference voltage and the voltage between the terminals of voltage-detecting resistor 102. PWM unit 104b generates a PWM signal according to the difference detected by error amplifier 104a. Driver 104c controls the ON/OFF state of switching elements 105 and 106 according to the PWM signal generated by PWM unit 104b. Driver 104c turns switching element 106 OFF when switching element 105 is turned ON, and turns switching element 106 ON when switching element 105 is turned OFF.

Inductor 107 supplies current to LED 101 by means of electromagnetic induction that is generated according to the ON/OFF state of switching elements 105 and 106.

In FIG. 1A, the cathode side of LED 101 is connected to GND (ground), whereby voltage of a positive value is supplied from AC/DC voltage converter 108. In FIG. 1B, on the other hand, the anode side of LED 101 is connected to GND, whereby voltage of a negative value is supplied from AC/DC voltage converter 108.

In Patent Document 1, a projection-type display device is disclosed in which LEDs are used as the light source and, moreover, in which the lighting time of the LEDs in unit time is regulated according to the luminance indicated by image signals.

In the projection-type display device described in Patent Document 1, LED lighting duty cycle that indicates the proportion of the lighting time of the LED with respect to the unit time changes dynamically according to the luminance indicated by an image signal.

The function by which the LED lighting duty cycle is controlled according to the luminance indicated by image signals is hereinbelow referred to as "dynamic dimming capability."

FIGS. 2A and 2B are figures for describing an example of the dynamic dimming capability, and more specifically, for showing the relation between the luminance (image signal level) indicated by an image signal and the LED lighting duty cycle. In FIG. 2A, graph "a" shows the transition of the image signal level, and in FIG. 2B, graph "b" shows the transition of the LED lighting duty cycle.

The technology for controlling the LED lighting duty cycle is realized by implementing PWM (pulse-width modulation) control of the drive signal (for example, a drive current signal) that is supplied to an LED.

The frequency of the LED drive signal that is implemented by PWM control is typically set within a range (200 Hz-1 kHz) that an LED can follow and does not recognize fluctuation of the brightness.

The frequency range (200 Hz-1 kHz) that is used as the frequency of the drive signal is contained within the range of frequencies (20 Hz-20 kHz) that the human ear can hear.

As a result, when a projection-type display device is equipped with a light source drive unit having an inductor such as shown in FIG. 1A or FIG. 1B, the problem arises that the inductor within the light source drive unit produces a noise (squeal) depending on the frequency of the drive signal.

However, most projection-type display devices are equipped with a cooling fan for cooling the components within the projection-type display device, and the noise of the inductor is drowned out by the drive sound of this cooling fan.

LITERATURE OF THE PRIOR ART

Patent Documents

Patent Document 1: Japanese Unexamined Patent Application Publication No. 2006-330743

SUMMARY OF THE INVENTION

Problem to be Solved by the Invention

In a projection-type display device, one way to prevent an image from becoming excessively bright, when the image is projected onto a small screen, is to reduce the brightness of the light source. Because a reduction of the amount of heat produced in the projection-type display device can also be expected to accompany a reduction in the brightness of the light source, a reduction in the rotational speed of the cooling fan can also be contemplated when the brightness of the light source has been reduced.

However, when a projection-type display device, in which the brightness of the light source is controlled by regulating the lighting duty cycle is provided with a light source drive unit having an inductor, as in the projection-type display device described in Patent Document 1, when the rotational speed of the cooling fan is decreased and the drive noise of the cooling fan thus reduced, a problem arises in which the noise from the inductor will become more noticeable to the user.

It is therefore an object of the present invention to provide a projection-type display device and method of controlling the operation of the projection-type display device that can solve the above-described problem.

Means for Solving the Problem

A projection-type display device according to the present invention is a projection-type display device, which projects and displays images in accordance with an image signal, that includes:

a light source for projecting the images;

output means that is equipped with a coil and switch, that uses electromagnetic induction of the coil to supply a current, and that changes the magnitude of the current by means of the switch;

a cooling fan that cools the projection-type display device and for which the rotational speed is variable; and control means that, upon receiving an instruction to set a first mode in which a first current is intermittently supplied to the light source, both controls the switch to set the output current of the output means to the first current and intermittently supply the first current to the light source and sets the rotational speed of the cooling fan to a first rotational speed; and upon receiving an instruction to set a second mode in which a second current that is smaller than the first current is continuously supplied to the light source, both controls the switch to set the output current of the output means to the second current and continuously supply the second current to the light source and sets the rotational speed of the cooling fan to a second rotational speed that is lower than the first rotational speed.

An operation control method of a projection-type display device according to the present invention is an operation control method of a projection-type display device that includes a light source for projecting images according to an image signal, output means that is equipped with a coil and a switch, that uses electromagnetic induction of the coil to supply a current, and that changes the magnitude of the current by means of the switch, and a cooling fan for cooling the projection-type display device and for which the rotational speed is variable; the operation control method includes:

upon receiving an instruction to set a first mode in which a first current is intermittently supplied to the light source, both controlling the switch to set the output current of the output means to the first current to intermittently supply the first current to the light source and setting the rotational speed of the cooling fan to a first rotational speed; and upon receiving an instruction to set a second mode in which a second current that is smaller than the first current is continuously supplied to the light source, both setting the output current of the output means to the second current to continuously supply the second current to the light source and setting the rotational speed of the cooling fan to a second rotational speed that is lower than the first rotational speed.

Effect of the Invention

The present invention enables a reduction in noise while reducing the luminance of a light source.

BRIEF DESCRIPTION OF THE DRAWINGS

FIG. 5 is a view that summarizes the operation states of projection-type display device 100.

MODE FOR CARRYING OUT THE INVENTION

An exemplary embodiment of the present invention is next described with reference to the accompanying drawings.

Figure 3:
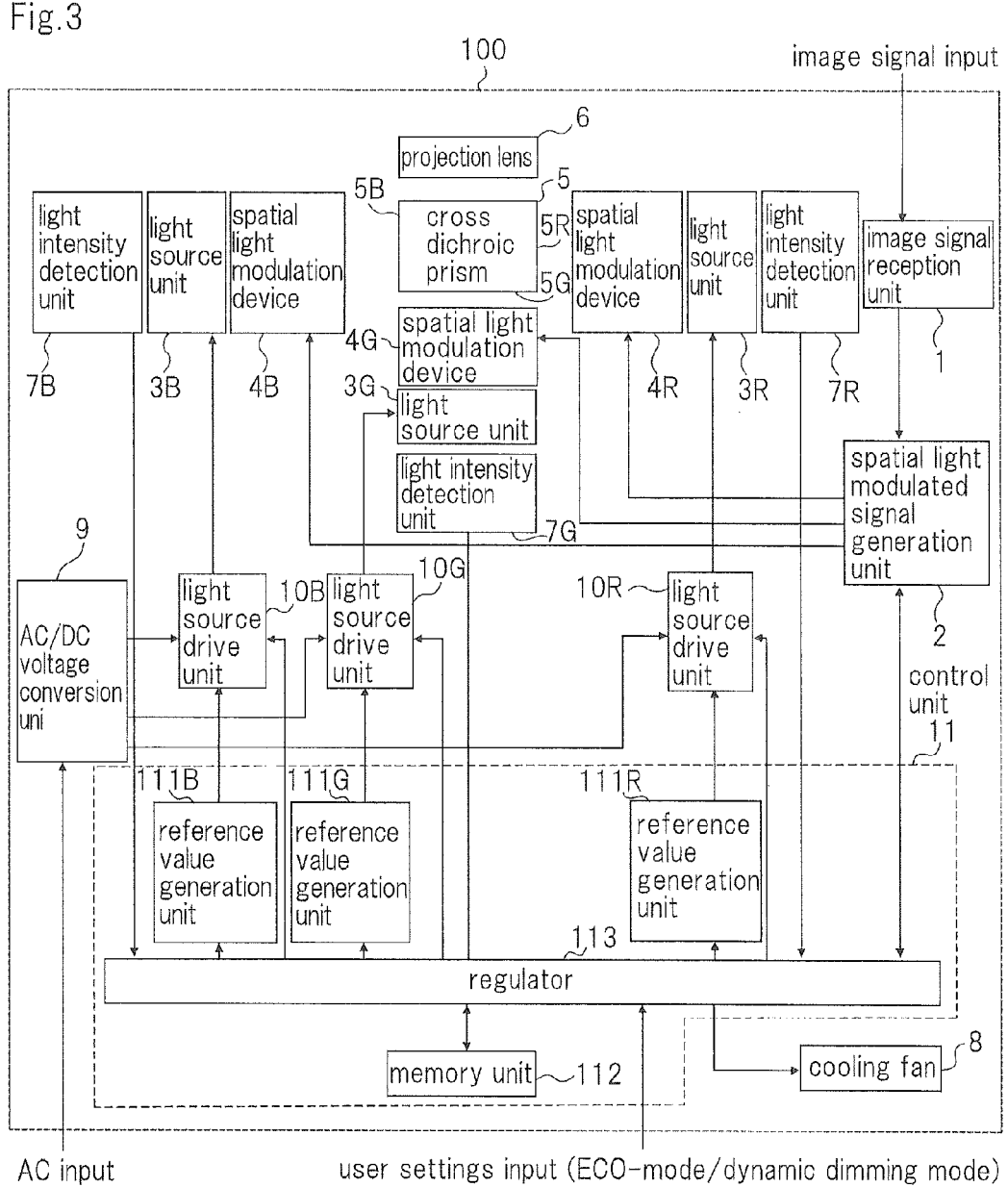
FIG. 3 is a block diagram showing projection-type display device 100 of an exemplary embodiment of the present invention.

FIG. 3 is a block diagram showing projection-type display device 100 of an exemplary embodiment of the present invention.

Projection-type display device 100 is a three-panel projection-type display device having a dynamic dimming capability.

Projection-type display device 100 includes: image signal reception unit 1, spatial light modulated signal generation unit 2, light source units 3R (red), 3G (green) and 3B (blue), spatial light modulation devices 4R, 4G, and 4B, cross-dichroic prism 5, projection lens 6, light intensity detection units 7R, 7G, and 7B, cooling fan 8, AC/DC voltage conversion unit 9, light source drive units 10R, 10G, and 10B, and control unit 11. Control unit 11 includes reference voltage generation units 111R, 111G, and 111B, memory unit 112, and regulator 113.

Image signal reception unit 1 receives image signals from an outside apparatus such as a PC (personal computer). Image signal reception unit 1 supplies an image signal to spatial light modulated signal generation unit 2.

Upon receiving the image signal, spatial light modulated signal generation unit 2 generates an R image signal, G image signal, and B image signal from the image signal. The R image signal, G image signal, and B image signal are examples of spatial light modulated signals.

Spatial light modulated signal generation unit 2 supplies the R image signal to spatial light modulation device 4R, supplies the G image signal to spatial light modulation device 4G, and supplies the B image signal to spatial light modulation device 4B. Spatial light modulated signal generation unit 2 further supplies the image signals to regulator 113.

Light source units 3R, 3G, and 3B are respectively a red LED that emits red light, a green LED that emits green light, and a blue LED that emits blue light. Light source units 3R, 3G, and 3B are used for projecting images (picture light) according to image signals.

Light source unit 3R is arranged to face surface 5R of cross-dichroic prism 5 and irradiates red light toward surface 5R.

Light source unit 3G is arranged to face surface 5G of cross-dichroic prism 5 and irradiates green light toward surface 5G.

Light source unit 3B is arranged to face surface 5B of cross-dichroic prism 5 and irradiates blue light toward surface 5B.

Spatial light modulation devices 4R, RG, and 4B are each transmissive liquid crystal panels.

Spatial light modulation device 4R is arranged between light source unit 3R and surface 5R. Spatial light modulation device 4R modulates the red light from light source unit 3R according to the R image signal.

Spatial light modulation device 4G is arranged between light source unit 3G and surface 5G. Spatial light modulation device 4G modulates the green light from light source unit 3G according to the G image signal.

Spatial light modulation device 4B is arranged between light source unit 3B and surface 5B. Spatial light modulation device 4B modulates the blue light from light source unit 3B according to the B image signal.

Cross-dichroic prism 5 synthesizes red light that has been modulated according to the R image signal, green light that has been modulated according to the G image signal, and blue light that has been modulated according to the B image signal and generates images according to the image signal.

Projection lens 6 projects the images that have been generated in cross-dichroic prism 5 onto a projection surface (not shown) such as a screen.

Light intensity detection units 7R, 7G, and 7B detect the intensity of red light from light source unit 3R, the intensity of green light from light source unit 3G, and the intensity of blue light from light source unit 3B, respectively.

Cooling fan 8 cools projection-type display device 100. Cooling fan 8 is capable of varying the rotational speed of cooling fan 8.

AC/DC voltage conversion unit 9 converts the alternating-current voltage (hereinbelow referred to as "AC voltage") from a commercial alternating-current power supply to a direct-current voltage.

Light source drive units 112R, 112G, and 112B are one example of the output means. Light source drive units 112R, 112G and 112B are each equipped with a coil and each uses the electromagnetic induction of the coil to supply current. Light source drive units 112R, 112G and 112B are further capable of varying the magnitude of the current.

Light source drive units 112R, 112G, and 112B drive light source units 3R, 3G, and 3B, respectively.

Control unit 11 is one example of the control means.

Control unit 11 includes a dynamic dimming mode and an ECO-mode. The dynamic dimming mode is one example of the first mode. The ECO-mode is one example of the second mode.

Upon receiving an instruction to set the dynamic dimming mode, control unit 11 sets the current from light source drive units 112R, 112G, and 112B to the first current (20 A in the present exemplary embodiment) and supplies the first current intermittently to light source units 3R, 3G, and 3B at a predetermined frequency (for example, 60 Hz) within the audible frequency band (20 Hz-20 k kHz).

Figure 2A:
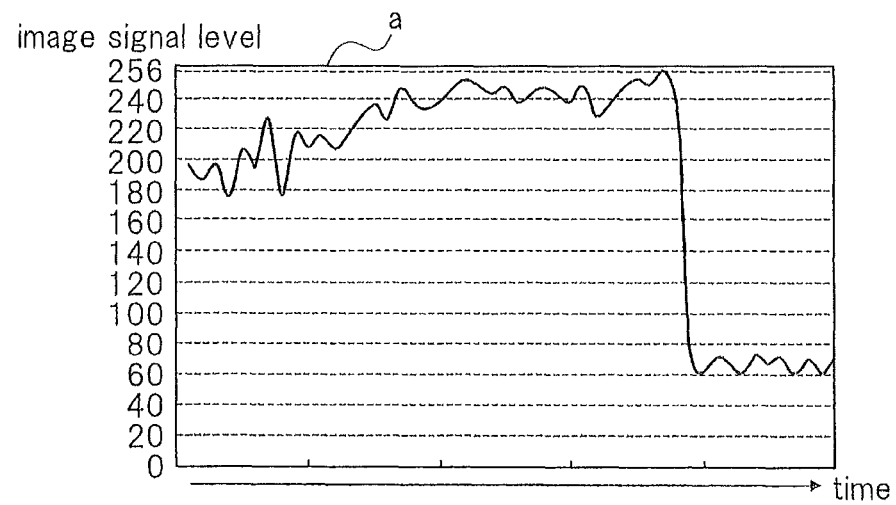
FIG. 2A is a view for describing an example of the dynamic dimming capability.
Figure 2B:
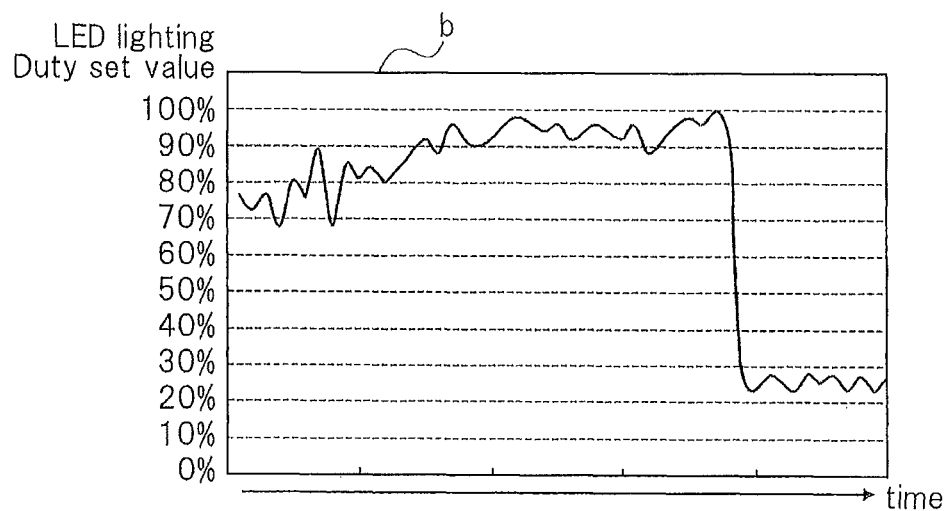
FIG. 2B is a view for describing an example of the dynamic dimming capability.

In the present exemplary embodiment, upon receiving an instruction to set the dynamic dimming mode, control unit 11 generates a PWM signal of a predetermined frequency according to the brightness (image signal level) indicated by the image signal and, in accordance with the PWM signal, supplies the first current intermittently to light source units 3R, 3G, and 3B at the predetermined frequency. In other words, in the dynamic dimming mode, control unit 11 uses the dynamic dimming capability to control the operation of light source units 3R, 3G, and 3B in accordance with the luminance (image signal level) indicated by the image signal as shown in FIG. 2.

In the present exemplary embodiment, control unit 11 lengthens the lighting periods in unit time with respect to light source units 3R, 3G, and 3B in accordance with increasing the luminance shown by the image signal.

Upon receiving an instruction to set the ECO-mode, control unit 11 sets the current from light source drive units 112R, 112G, and 112B to a second current (10 A in the present exemplary embodiment) that is lower than the first current and supplies the second current continuously to light source units 3R, 3G, and 3B. Essentially, in the ECO-mode, control unit 11 continuously lights light source units 3R, 3G, and 3B at a luminance that is lower than the maximum luminance of light source units 3R, 3G, and 3B during the dynamic dimming mode.

Reference voltage generation units 111R, 111G, and 111B each generate a reference value of the voltage that is to be applied to light source unit 3R, a reference value of the voltage that is to be applied to light source unit 3G, and a reference value of the voltage that is to be applied to light source unit 3B, respectively.

Figure 4A:
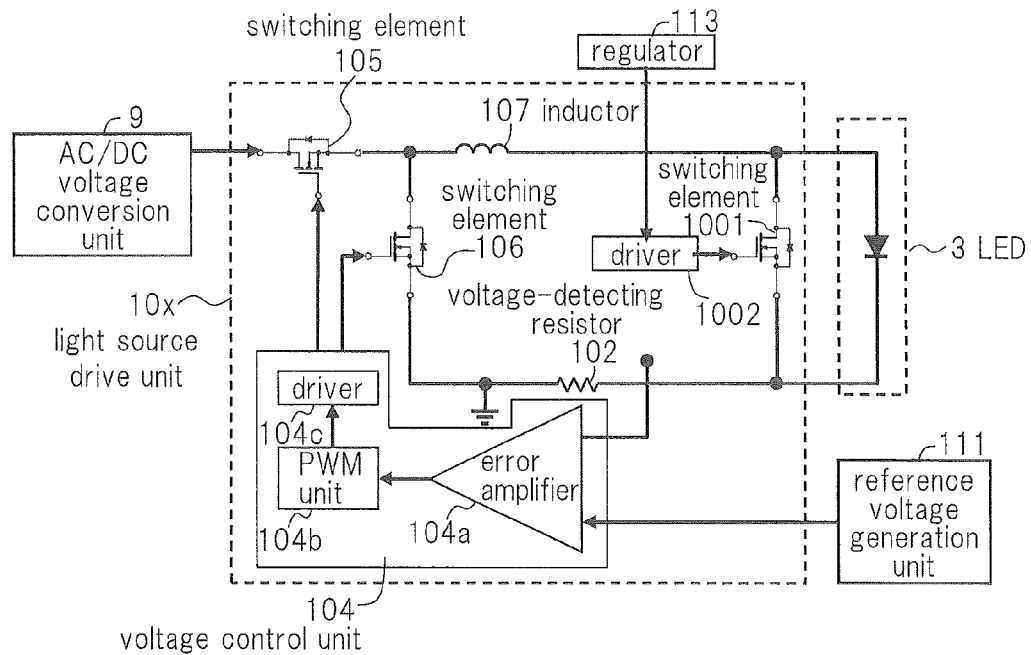
FIG. 4A shows light source drive unit 10x.
Figure 4B:
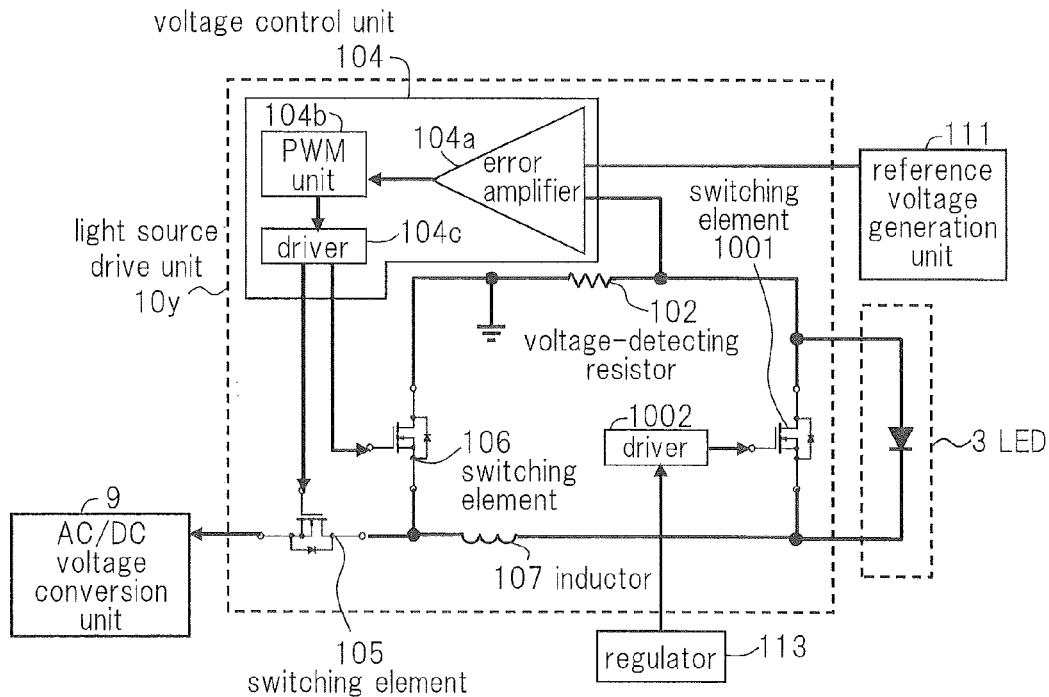
FIG. 4B shows light source drive unit 10y.

FIGS. 4A and 4B show light source drive unit 10x and 10y that can be used as light source drive units 10R, 10G, and 10B.

Figure 1A:
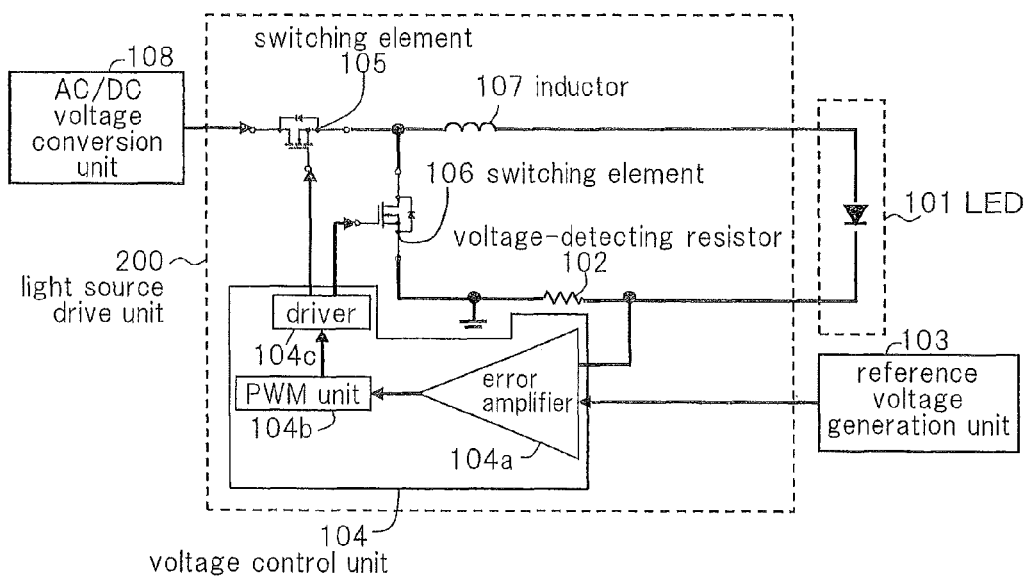
FIG. 1A shows an example of a light source drive unit.
Figure 1B:
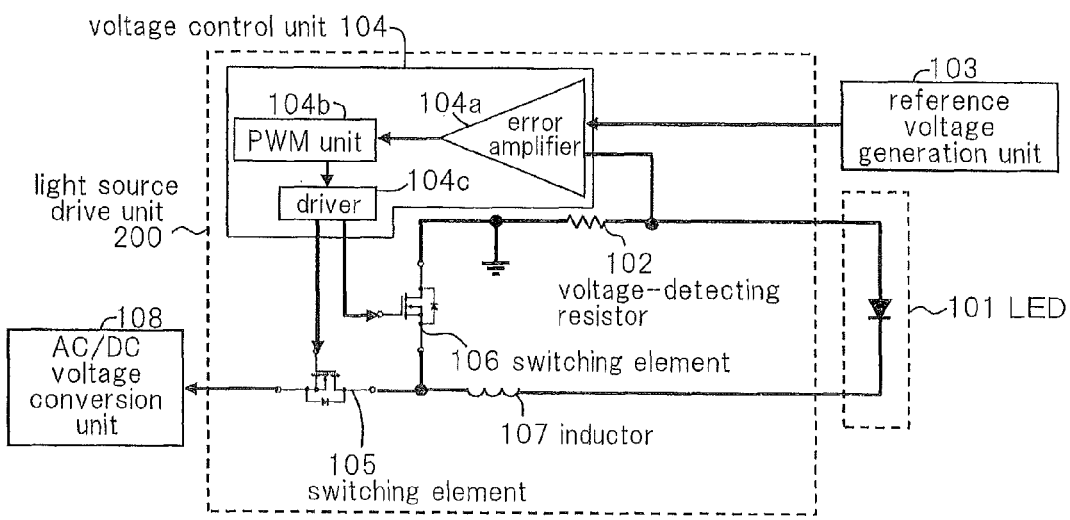
FIG. 1B shows an example of a light source drive unit.

In FIGS. 4A and 4B, constituent elements that are identical to elements shown in FIGS. 1A and 1B or FIG. 3 are given the same numbers.

Light source drive unit 10x shown in FIG. 4A is a light source drive unit in which switching element 1001 and driver 1002 are added to light source drive unit 200 shown in FIG. 1A. In addition, light source drive unit 10y shown in FIG. 4B is a light source drive unit in which switching element 1001 and driver 1002 are added to light source drive unit 200 shown in FIG. 1B.

Switching element 1001 is connected in parallel with LED 3. Driver 1002 is ON/OFF controlled by regulator 113.

In FIG. 3, memory unit 112 stores the reference voltage and the rotational speed of cooling fan 8 in the dynamic dimming mode, the reference voltage and rotational speed of cooling fan 8 in the ECO-mode, and the reference voltage, the light intensity reference value, and the rotational speed of cooling fan 8 at times when a mode has not been selected.

In the present exemplary embodiment, memory unit 112 stores a reference voltage of 50 mV and a rotational speed of cooling fan 8 of 2,000 rpm as the reference voltage and cooling fan 8 rotational speed in the dynamic dimming mode.

In addition, memory unit 112 stores a reference voltage of 25 mV and a cooling fan 8 rotational speed of 1,000 rpm as the reference voltage and cooling fan 8 rotational speed of the ECO-mode.

Memory unit 112 further stores a reference voltage of 50 mV, a cooling fan 8 rotational speed of 2,000 rpm, and a light intensity reference value of 10 mW as the reference voltage, cooling fan 8 rotational speed, and light intensity reference value at times in which a mode has not been selected.

The reference voltage and the rotational speed of cooling fan 8 in the dynamic dimming mode, the reference voltage and rotational speed of cooling fan 8 in the ECO-mode, and the reference voltage, rotational speed of cooling fan 8, and light intensity reference value at times in which a mode has not been selected are not limited to the values described above, but the reference voltage in the dynamic dimming mode and the reference voltage at times in which a mode has not been selected should be higher than the reference voltage in the ECO-mode, and the rotational speed of cooling fan 8 in the dynamic dimming mode and at times in which a mode has not been selected should be higher than the rotational speed of cooling fan 8 in the ECO-mode.

Regulator 113 detects the mode that has been set by the user and controls the operation of light source units 3R, 3G, and 3B (more specifically, the operation of light source drive units 10R, 10G, and 10B) and the operation of cooling fan 8 in accordance with the mode that was detected.

The operation is next described.

Regulator 113 constantly verifies the state of the mode that has been set by the user.

When the ECO-mode has been set by the user, regulator 113 reads from memory unit 112 the set values of each of the reference voltage and rotational speed of cooling fan 8

(reference voltage of 25 mV and cooling fan 8 rotational speed of 1,000 rpm) in the ECO-mode.

Regulator 113 next supplies an instruction signal to each driver 1002 in light source drive units 10R, 10G, and 10B (see FIG. 4A or FIG. 4B) indicating that switching element 1001 is to be turned OFF, further causes reference voltage generation units 111R, 111G, and 111B to generate the reference voltage of 25 mV of the ECO-mode, and moreover, sets the rotational speed of cooling fan 8 to the rotational speed of 1,000 rpm of the cooling fan 8 in the ECO-mode.

The rotational speed of 1,000 rpm of cooling fan 8 in the ECO-mode is an example of the second rotational speed.

In light source drive units 10R, 10G, and 10B, voltage control unit 104 implements control of the ON/OFF timing of switching elements 105 and 106 such that the voltage between the terminals of voltage-detecting resistor (having resistance of, for example, 2.5 mΩ) 102 is equal to reference voltage value 25 mV that was generated in reference voltage generation unit 111.

A constant current of 10 A (=25 mV÷2.5 mΩ) therefore flows to each of light source units 3R, 3G, and 3B. The constant current of 10 A is one example of the second current.

At this time, i.e., in the ECO-mode, regulator 113 sets a state in which each of switching elements 1001 in light source drive units 10R, 10G, and 10B remain OFF, i.e., a state identical to LED lighting duty=100%.

Accordingly, noise (squeal) from inductors 107 in light source drive units 10R, 10G, and 10B is no longer generated. As a result, causing the rotational speed of 1,000 rpm of cooling fan 8 in the ECO-mode to be lower than the rotational speed of 2,000 rpm of cooling fan 8 in the dynamic dimming mode does not result in any problems.

Next, when the dynamic dimming mode has been set by the user, regulator 113 reads from memory unit 112 each of the set values of the reference voltage and rotational speed of cooling fan 8 in the dynamic dimming mode (reference voltage of 50 mV and cooling fan 8 rotational speed of 2,000 rpm).

Next, as shown in FIG. 1, regulator 113 generates a PWM signal having a predetermined frequency within the audible frequency band according to the level of the image signal such that the LED lighting duty cycle is adjusted according to the level of the image signal from spatial light modulated signal generation unit 2, supplies this PWM signal to driver 1002, and moreover, causes reference voltage generation units 111R, 111G, and 111B to generate the reference voltage of 50 mV of the dynamic dimming mode, and finally, sets the rotational speed of cooling fan 8 to the rotational speed of 2,000 rpm of cooling fan 8 in the dynamic dimming mode.

The rotational speed 2,000 rpm of cooling fan 8 in the dynamic dimming mode is an example of the first rotational speed.

Upon receiving the PWM signal, each driver 1002 implements ON/OFF control of switching element 1001 in accordance with the PWM signal at the frequency of the PWM signal.

In each of light source drive units 10R, 10G, and 10B, voltage control unit 104 controls the ON/OFF timing of switching elements 105 and 106 such that the voltage between the terminals of voltage-detecting resistor (resistance 2.5 mΩ) 102 is equal to the reference voltage value of 50 mV that is generated in reference voltage generation unit 111.

A constant current of 20 A (=50 mV÷2.5 mΩ) therefore flows in each of LEDs 3R, 3G, and 3B when switching element 1001 is in the OFF state, and current does not flow in LEDs 3R, 3G, and 3B when switching element 1001 is in the ON state. The constant current of 20 A is one example of the first current.

At this time, i.e., in the dynamic dimming mode, regulator 113 switches each switching element 1001 in light source drive units 10R, 10G, and 10B ON and OFF based on the LED lighting Duty Cycle (for example, the PWM frequency of 600 Hz) that accords with the level of the image signal such as shown in FIG. 2.

Although noise (squeal) is thus generated from each inductor 107 in light source drive units 10R, 10G, and 10B, cooling fan 8 rotates at a rotational speed that is higher than the rotational speed during the ECO-mode, and the noise (squeal) from each inductor 107 is therefore drowned out by the drive noise of cooling fan 8 and does not create a problem.

Next, when neither the ECO-mode nor the dynamic dimming mode has been set by the user, regulator 113 reads from memory unit 112 each of the set values of the reference voltage value, the rotational speed of cooling fan 8, and the light intensity reference value (a reference voltage of 50 mV, rotational speed of 2,000 rpm of cooling fan 8, and light intensity reference value of 10 mW) for times in which a mode has not been selected.

Regulator 113 next causes reference voltage generation units 111R, 111G, and 111B to generate the reference voltage 50 mV in the dynamic dimming mode, and further, sets the rotational speed of cooling fan 8 to the rotational speed 2,000 rpm of cooling fan 8 in the dynamic dimming mode.

In light source drive units 10R, 10G, and 10B, voltage control units 104 implement control of the ON/OFF timing of switching elements 105 and 106 such that the voltage between the terminals of voltage-detecting resistors (resistance of 2.5 mΩ) 102 is equal to the reference voltage value of 50 mV that was generated in reference voltage generation unit 111.

A constant current of 20 A (=50 mV÷2.5 mΩ) therefore flows to LEDs 3R, 3G, and 3B when switching element 1001 is in the OFF state, and current does not flow to any of LEDs 3R, 3G, and 3B when switching element 1001 is in the ON state.

At this time, regulator 113 uses light intensity detection units 7R, 7G, and 7B to detect the intensity of light from light source units 3R, 3G, and 3B and supplies a PWM signal to driver 1002 such that the intensity of light from light source units 3R, 3G, and 3B is the light intensity reference value. The frequency of this PWM signal is a frequency within the audible frequency band.

Upon receiving the PWM signal, each of drivers 1002 controls the ON/OFF of switching element 1001 in accordance with the PWM signal at the frequency of the PWM signal.

Although noise (squeal) is consequently produced from each of inductors 107 in light source drive units 10R, 10G, and 10B, cooling fan 8 rotates at a higher rotational speed than the rotational speed during ECO-mode and the noise (squeal) from each of inductors 107 is therefore drowned out by the noise of cooling fan 8 and does not pose any problem.

FIG. 5 is a figure for summarizing the operation states of projection-type display device 100.

The effect of the present exemplary embodiment is next described.

According to the present exemplary embodiment, control unit 11 includes a dynamic dimming mode in which a current of 20 A is supplied intermittently to light source units 3R, 3G, and 3B to control the lighting of light source units 3R, 3G, and 3B and an ECO-mode in which a current of 10 A is supplied continuously to light source units 3R, 3G, and 3B to control the lighting of light source units 3R, 3G, and 3B. Control unit 11 rotates cooling fan 8 at 2,000 rpm in the dynamic dimming mode and rotates cooling fan 8 at 1,000 rpm in the ECO-mode.

As a result, although noise is produced when a current of 20 A is supplied intermittently to light source units 3R, 3G, and 3B at a frequency that is within the audible frequency band during the dynamic dimming mode, this noise is drowned out if the rotational speed of cooling fan 8 during the dynamic dimming mode is set to a rotational speed (first rotational speed) at which this noise is drowned out by the drive noise of cooling fan 8. In the ECO-mode in which the brightness of light source units 3R, 3G, and 3B is reduced, noise is not produced. As a result, although the rotational speed of cooling fan 8 is made lower than the rotational speed during the dynamic dimming mode and the noise of cooling fan 8 becomes lower, any objectionable noise is no longer noticeable to the user. Accordingly, noise can be reduced while lowering the luminance of the light source.

In the present exemplary embodiment, control unit 11 in the dynamic dimming mode generates a PWM signal of a frequency within the audible frequency band according to the luminance that is indicated by the image signal, and in accordance with this PWM signal, a current of 20 A is intermittently supplied to light source units 3R, 3G, and 3B at a frequency within the audible frequency band.

In the exemplary embodiment described hereinabove, a current of 20 A is used as the first current and a current of 10 A is used as the second current, but the first current and second current are not limited to a current of 20 A and a current of 10 A and can be altered as appropriate as long as the first current is greater than the second current.

In addition, in the exemplary embodiment described hereinabove, 2,000 rpm was used as the first rotational speed and 1,000 rpm was used as the second rotational speed, but the first rotational speed and the second rotational speed are not limited to 2,000 rpm and 1,000 rpm and can be altered as appropriate as long as the first rotational speed is higher than the second rotational speed.

Still further, in the exemplary embodiment described hereinabove, a three-panel projection-type display device was used as projection-type display device 100, but projection-type display device 100 is not limited to a three-panel projection-type display device and can be altered as appropriate.

Although the invention of the present application has been described with reference to an exemplary embodiment, the invention of the present application is not limited to the above-described exemplary embodiment. The configuration and details of the invention of the present application are open to various modifications within the scope of the invention of the present application that will be clear to one of ordinary skill in the art.

EXPLANATION OF REFERENCE NUMBERS 100 projection-type display device
1 image signal reception unit
2 spatial light modulated signal generation unit
3R, 3G, 3B light source unit
4R, 4G, 4B spatial light modulation device
5 cross-dichroic prism
6 projection lens
7R, 7G, 7B light intensity detection unit
8 cooling fan
9 AC/DC voltage conversion unit
10R, 10G, 10B light source drive unit
11 control unit
102 voltage-detecting resistor
104 voltage control unit
104a error amplifier
104b PWM unit
104c, 1002 driver
105, 106, 1001 switching element
107 inductor
111R, 111G, 111B reference voltage generation unit
112 memory unit
113 regulator

What is claimed is:

1. A projection-type display device that projects and displays images in accordance with an image signal, comprising:
a light source for projecting the images;
an output unit that is equipped with a coil and switch, that uses electromagnetic induction of the coil to supply a current, and that changes the magnitude of the current by means of the switch;
a cooling fan that cools a component within the projection-type display device and for which the rotational speed is variable; and
a control unit including a memory unit and a regulator storing instructions to cause the control unit to:
upon receiving an instruction to set a first mode, concurrently both controls the switch to set the output current of the output unit to a first current and intermittently supply the first current to the light source in accordance with a Pulse-Width Modulation (PWM) signal and sets the rotational speed of the cooling fan to a first rotational speed; and
upon receiving an instruction to set a second mode in which the light source continuously emits light for projecting the images, concurrently both controls the switch to set the output current of the output unit to a second current that is smaller than the first current and continuously supply the second current to the light source and sets the rotational speed of the cooling fan to a second rotational speed that is lower than the first rotational speed,
wherein, in the second mode, the regulator sets a state in which the LED lighting duty equals 100%.

2. The projection-type display device as set forth in claim 1, wherein the control unit, upon receiving the instruction to set the first mode, generates the PWN signal of a predetermined frequency according to a brightness indicated by the image signal.

3. The projection-type display device as set forth in claim 1, wherein the light source comprises an LED.

4. The projection-type display device as set forth in claim 1, wherein, in the first mode, the control unit controls the switch to set the output current of the output unit to the first current and intermittently supply the first current to the light source at a predetermined frequency within an audible frequency band.

5. The projection-type display device as set forth in claim 1, wherein, in the first mode, the control unit controls the operation of the light source in accordance with an image signal level indicated by the image signal.

6. The projection-type display device as set forth in claim 1, wherein, in the first mode, the control unit increases the intermittent supply of the first current based on an increasing of the image signal level indicated by the image signal.

7. The projection-type display device as set forth in claim 1, wherein the memory unit stores a reference voltage and the first rotational speed of the cooling fan in the first mode, a reference voltage and the second rotational speed of the cooling fan in the second mode, and a reference voltage, a light intensity reference value, and a rotational speed of the cooling fan at times when either the first mode or the second mode has not been selected in which the regulator instructs the control unit to perform control based on the stored values of the memory unit.

8. The projection-type display device as set forth in claim 1, wherein the light source comprises a semiconductor light emitting element.

9. The projection-type display device as set forth in claim 1, wherein the control unit concurrently both controls the switch to set the output current of the output unit to the first current and intermittently supplies the first current to the light source and sets the rotational speed of the cooling fan to the first rotational speed to thereby drown out an audible frequency.

10. An operation control method of a projection-type display device that includes a light source for projecting images according to an image signal, an output unit that is equipped with a coil and a switch, that uses electromagnetic induction of the coil to supply a current, and that changes a magnitude of the current by means of the switch, and a cooling fan for cooling a component within the projection-type display device and for which the rotational speed is variable; the operation control method comprising:

upon receiving an instruction to set a first mode, concurrently both controlling the switch to set the output current of the output unit to a first current to intermittently supply the first current to the light source in accordance with a Pulse-Width Modulation (PWN) signal and setting the rotational speed of the cooling fan to a first rotational speed; and upon receiving an instruction to set a second mode in which the light source continuously emits light for projecting the images, concurrently both setting the output current of the output unit to a second current that is smaller than the first current to continuously supply the second current to the light source and setting the rotational speed of the cooling fan to a second rotational speed that is lower than the first rotational speed, wherein, in the second mode, a state in which the LED lighting duty equals 100% is set.

11. A projection-type display device that projects and displays images in accordance with an image signal, comprising:

a light source for projecting the images;

an output unit for supplying a current and for changing a magnitude of the current;

a cooling fan for cooling a component within the projection-type display device and for which the rotational speed is variable; and a control unit that:

upon receiving an instruction to set a first mode, concurrently sets the output current of the output unit to a first current and intermittently supplies the first current to the light source in accordance with a Pulse-Width Modulation (PWN) signal and sets the rotational speed of the cooling fan to a first rotational speed; and upon receiving an instruction to set a second mode in which the light source continuously emits light for projecting the images, concurrently sets the output current of the output unit to a second current that is smaller than the first current and continuously supplies the second current to the light source and sets the rotational speed of the cooling fan to a second rotational speed that is lower than the first rotational speed, wherein, in the second mode, the control unit sets a state in which the LED lighting duty equals 100%.

\* \* \* \* \*